W. B. KEIGHLEY.
SHARPENING MEANS FOR BAND KNIVES.
APPLICATION FILED MAR. 11, 1909.

937,532.

Patented Oct. 19, 1909.

2 SHEETS—SHEET 1.

W. B. KEIGHLEY.
SHARPENING MEANS FOR BAND KNIVES.
APPLICATION FILED MAR. 11, 1909.

937,532.

Patented Oct. 19, 1909.
2 SHEETS—SHEET 2.

Witnesses:

Inventor:—
William B. Keighley.
by his Attorneys

UNITED STATES PATENT OFFICE.

WILLIAM B. KEIGHLEY, OF VINELAND, NEW JERSEY.

SHARPENING MEANS FOR BAND-KNIVES.

937,532.  Specification of Letters Patent.  Patented Oct. 19, 1909.

Application filed March 11, 1909. Serial No. 482,732.

*To all whom it may concern:*

Be it known that I, WILLIAM B. KEIGHLEY, a citizen of the United States, residing in Vineland, New Jersey, have invented certain Improvements in Sharpening Means for Band-Knives, of which the following is a specification.

One object of my invention is to provide a relatively simple device capable of being utilized either to continuously act upon a band knife to sharpen the same or capable of adjustment into and out of engagement with such a knife for accomplishing the same purpose. I further desire to provide a knife sharpening means which may be conveniently and quickly moved toward and from a band knife for the purpose of giving the same a sharp beveled edge; at the same time so arranging the parts that one of the grinding wheels may be available for use as a tool sharpening means. I also desire to provide a novel form of tool carrier for supporting a certain form of tool in such position, relatively to a grinding wheel, as to give it a definite bevel at one end. These objects and other advantageous ends I secure as hereinafter set forth, reference being had to the accompanying drawings, in which:—

Figure 1:
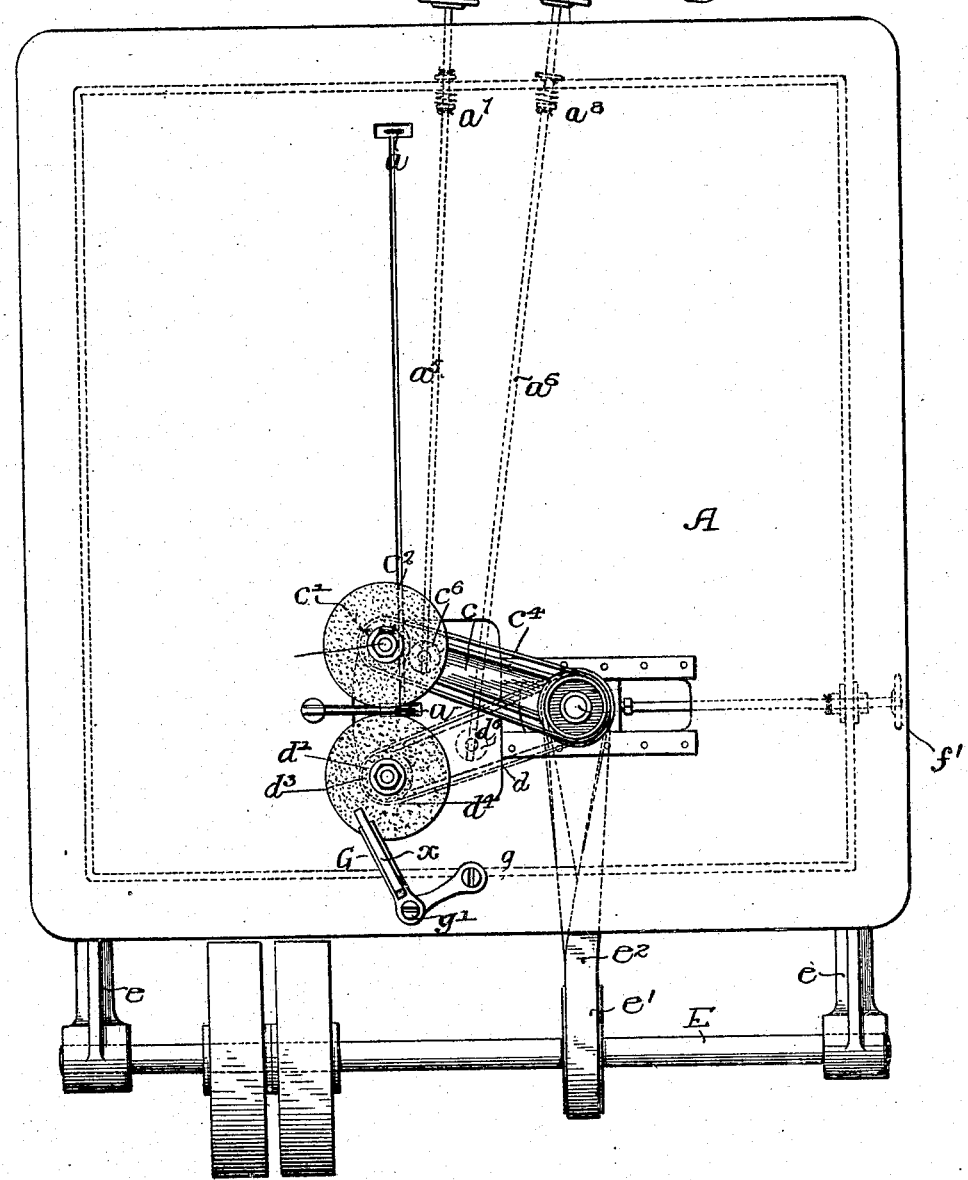
Figure 2:
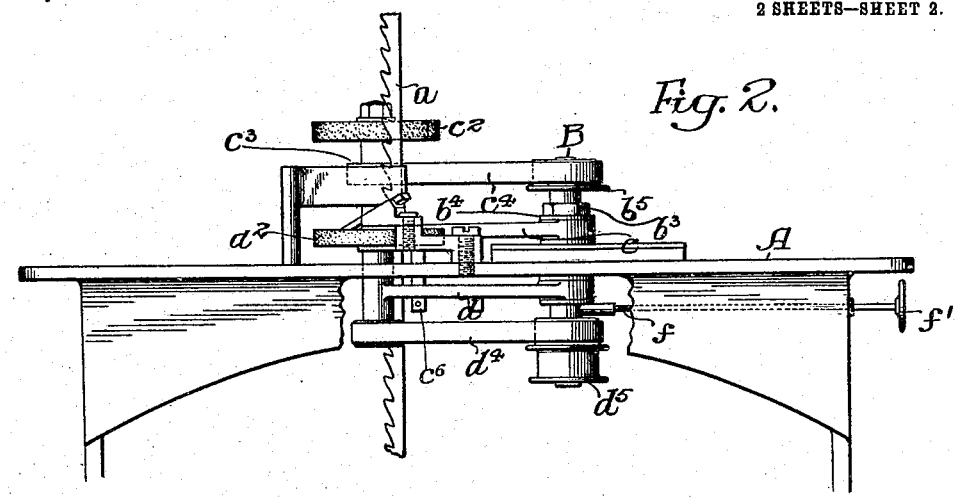
Figure 3:
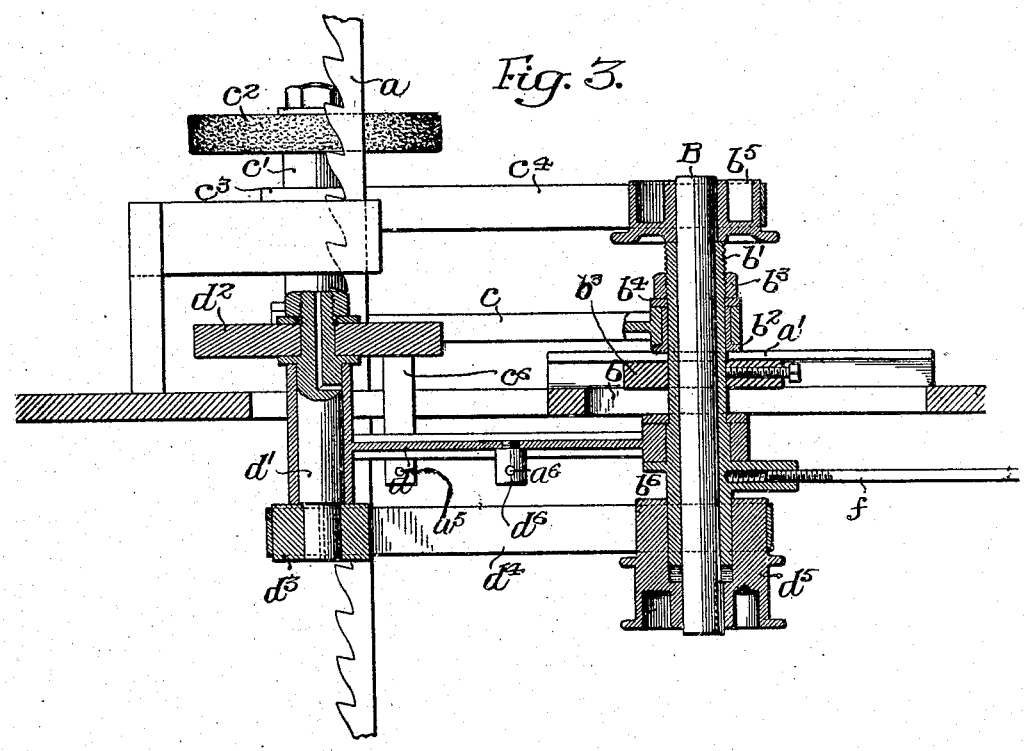

Figure 1, is a plan view of the table of a band knife machine illustrating my invention as applied thereto; Fig. 2, is a side elevation of the parts shown in Fig. 1, part of the table being cut away to further illustrate my invention; Fig. 3, is a vertical section of certain of the mechanism shown in Fig. 2, on a slightly enlarged scale; and Figs. 4 and 5 are respectively a plan and a side elevation illustrating the tool support forming part of my invention.

In the above drawings, A represents the table of a band knife machine which, while it may be made of any desired type, in the present instance is preferably constructed as shown in the application of Keighley et al., Serial No. 424,184, filed March 30, 1908.

In the illustrations I have shown the knife at $a$ and have omitted the supporting and driving means therefor since they form no part of the present invention. It will be seen, however, that the knife extends in a line perpendicular to the surface of the table A, which is slotted to permit of the mounting of said knife on its supporting wheels, and on this table I mount a vertical spindle B, which extends parallel to the knife through a slot $b$ so as to be capable of movement toward and from said knife. For the purpose of supporting this spindle I provide guides or gibs $a'$ on each side of the slot and place on the spindle a sleeve $b'$ on which is mounted a collar $b^8$ held in place by a set screw. Immediately above and slidable on said guides is a collar $b^2$ which abuts on a nut $b^3$ screwed to the sleeve $b'$ and having interposed between it and the upper edge of said collar a washer $b^4$.

An arm $c$ is rotatably mounted on the collar $b^2$ and carries at its end a rotatable, vertically extending spindle $c'$ to the upper end of which is keyed or otherwise fixed an emery or other abrading wheel $c^2$. Immediately below this wheel there is fixed to the spindle a pulley $c^3$, which is connected by a belt $c^4$ to a pulley $b^5$ keyed or otherwise fixed to the upper end of the spindle B so as to rest upon the upper end of the sleeve $b'$ and hold said spindle in proper position. Immediately under the table in the present instance there is mounted a second arm $d$ which is rotatable upon the sleeve $b'$ and is supported in position by a collar or flange $b^6$. This arm at its outer end provides a bearing for a spindle $d'$ which extends through a slot in the table and has keyed to it a second abrading wheel $d^2$ and a pulley $d^3$. This latter is operatively connected through a belt $d^4$ with a double faced pulley $d^5$ keyed or otherwise fixed to the spindle B. For driving said spindle I provide a shaft E mounted in suitable bearings in brackets $e$ and connected to said pulley through a pulley $e'$ and a belt $e^2$. Projecting downwardly from the arm $c$ is a rod $c^6$ and similarly there is a shorter projecting portion $d^6$ on the arm $d$, while as shown in Fig. 1, these posts or rods $c^6$ or $d^6$ have threaded openings for the reception of rods $a^5$ and $a^6$ which extend under the table to one edge thereof where they are suitably supported. Said rods are provided with operating levers or handles and are so placed that when turned they cause said arms $c$ and $d$ to swing on their supporting sleeves $d'$ either toward or from the knife $a$. As a result, said two wheels, which lie in planes at right angles to the line of the knife, will be moved so as to remain continuously in engagement with said knife and at all times have a sharpening action thereon. On the other hand, they may, if desired, normally remain out of engagement with the knife but be moved so as to sharpen it when desired.

It is obvious that the various parts may be arranged to give the knife any desired bevel, and in order to adjust their action upon the knife I preferably thread a rod $f$ into the sleeve $b'$ and provide said rod with a hand wheel $f'$. By this means said rod may be turned when desired to cause the said sleeve $b'$ with the spindle B and the two abrading wheels to be bodily moved on the slides or gibs $a'$ toward and from the knife $a$, so as not only to sharpen it at the proper bevel, but also to compensate for the wear of the knife and of the abrading wheels.

In order to utilize one of the wheels as $d^2$ for the purpose of sharpening the work supporting bar used in connection with the band knife, I provide an arm G pivotally mounted on a spindle formed by a screw bolt $g$ fixed to the plate A near said wheel. On the free end of this arm I rotatably mount a second arm $G'$, holding it in place by a second bolt $g'$. This second arm preferably has the form of a flat triangular plate supported in a vertical plane and having its top edge grooved for the reception of the bar $x$ which is to be sharpened. This groove is so formed as to extend at a predetermined angle to the plane face or side of the abrading wheel $d^2$, so that when said bar $x$ is placed in said groove, its lower end will engage with the surface of the wheel and be cut or worn thereby to the desired angle.

Under conditions of use the tool is placed in the groove and then the two arms G and $G'$ are swung on their pivots so as to bring its lower end over the upper side of the abrading wheel, after which said tool may be caused to slide downwardly until such lower end comes into engagement with the wheel.

By the arrangement of arms shown, it is possible to give the tool the proper bevel at its ends, even though the abrading wheel be of widely varying sizes at different times. The device is, moreover, so arranged that the sharpening of the tool may be accomplished without in any way interfering with the adjustment of the wheel relatively to the band knife.

I claim:—

1. The combination of a band knife, a spindle extending substantially parallel thereto, driving means for said spindle, two arms mounted to swing concentrically with the spindle and projecting on opposite sides of the knife, a spindle for each of said arms, an abrading wheel on each of said latter spindles, with means for operatively connecting the spindles on the arms with the first spindle.

2. The combination of a band knife, a spindle extending substantially parallel thereto, driving means for said spindle, two arms mounted to swing concentrically with the spindle and projecting on opposite sides of the knife, a spindle for each of said arms, an abrading wheel on each of said latter spindles, means for operatively connecting the spindles on the arms with the first spindle, and means for swinging said arms at will toward and from the knife.

3. The combination with a band knife of a spindle mounted so as to extend in a line substantially parallel thereto and having driving means, means for moving said spindle bodily toward and from the knife while maintaining its connection with the driving means, driving means for the spindle, an arm mounted to swing concentrically with the spindle, a spindle carried by said arm, an abrading wheel on said spindle, means capable of drawing said wheel into engagement with the knife, and means for operatively connecting the two spindles.

4. The combination with a band knife of a spindle, two arms mounted on said spindle so as to swing about the same as an axis, a spindle carried by the free end of each arm, an abrading wheel on each of the spindles, means for driving the first spindle, means for operatively connecting said spindle to the spindles on the arms, with a device for bodily moving said apparatus toward and from the knife.

5. The combination with a band knife of a spindle, two arms mounted on said spindle so as to swing about the same as an axis, a spindle carried by the free end of each arm, an abrading wheel on each of the spindles, means for driving the first spindle, means for operatively connecting said spindle to the spindles on the arms, a device for bodily moving said apparatus toward and from the knife, and means for adjusting the arms relatively to the knife.

In testimony whereof, I have signed my name to this specification, in the presence of two subscribing witnesses.

WILLIAM B. KEIGHLEY.

Witnesses:
 HARRISON C. BROWNE,
 W. S. BROWNE.